United States Patent [19]

Fujimoto et al.

[11] 4,425,231

[45] Jan. 10, 1984

[54] WASTE WATER TREATING APPARATUS

[75] Inventors: Tadao Fujimoto, Kobe; Tadaaki Kawasugi, Nara, both of Japan

[73] Assignee: Kubota, Ltd., Osaka, Japan

[21] Appl. No.: 297,000

[22] Filed: Aug. 27, 1981

[30] Foreign Application Priority Data

Feb. 10, 1981 [JP] Japan .................. 56-17538

[51] Int. Cl.³ .............................................. C02F 3/30
[52] U.S. Cl. ................... 210/96.1; 210/605;
210/614; 210/629; 210/170; 210/195.3;
210/199; 210/205; 210/746; 210/903; 210/218
[58] Field of Search ............... 210/605, 608, 626, 627,
210/628, 629, 630, 614, 170, 747, 96.1, 199,
195.3, 194, 903, 205, 746, 218

[56] References Cited

U.S. PATENT DOCUMENTS

| | | | |
|---|---|---|---|
| 3,900,394 | 8/1975 | Rongved | 210/629 |
| 4,026,802 | 5/1977 | Akae | 210/630 |
| 4,159,243 | 6/1979 | Okey | 210/629 |
| 4,183,810 | 1/1980 | Baenens et al. | 210/614 |
| 4,278,546 | 7/1981 | Roesler | 210/199 |
| 4,340,484 | 7/1982 | Pollock et al. | 210/608 |

FOREIGN PATENT DOCUMENTS

| | | | |
|---|---|---|---|
| 49-31226 | 8/1974 | Japan . | |
| 50-38357 | 4/1975 | Japan . | |
| 50-113047 | 9/1975 | Japan . | |
| 51-20072 | 2/1976 | Japan | 210/614 |
| 52-79573 | 7/1977 | Japan . | |
| 53-48356 | 5/1978 | Japan | 210/903 |
| 54-42850 | 4/1979 | Japan . | |
| 54-99352 | 8/1979 | Japan | 210/629 |
| 54-120942 | 9/1979 | Japan | 210/903 |
| 54-120953 | 9/1979 | Japan . | |
| 54-121564 | 9/1979 | Japan | 210/96.1 |

Primary Examiner—Benoit Castel
Attorney, Agent, or Firm—W. G. Fasse; D. H. Kane, Jr.

[57] ABSTRACT

A waste water treating apparatus includes a circulation type aeration tank having a downward flow chamber and an upward flow chamber extending in the depth direction and communicating with each other at the upper and lower ends thereof. An oxygen containing gas is supplied to the downward flow chamber and waste water and return sludge are supplied to a given position or elevation of the upward flow chamber to be mixed with a mixed liquor flowing through the upward flow chamber, whereby a reduction zone with a low concentration of dissolved oxygen is formed at the upper portion of the upward flow chamber. Denitrification takes place in the above described reduction zone.

34 Claims, 21 Drawing Figures

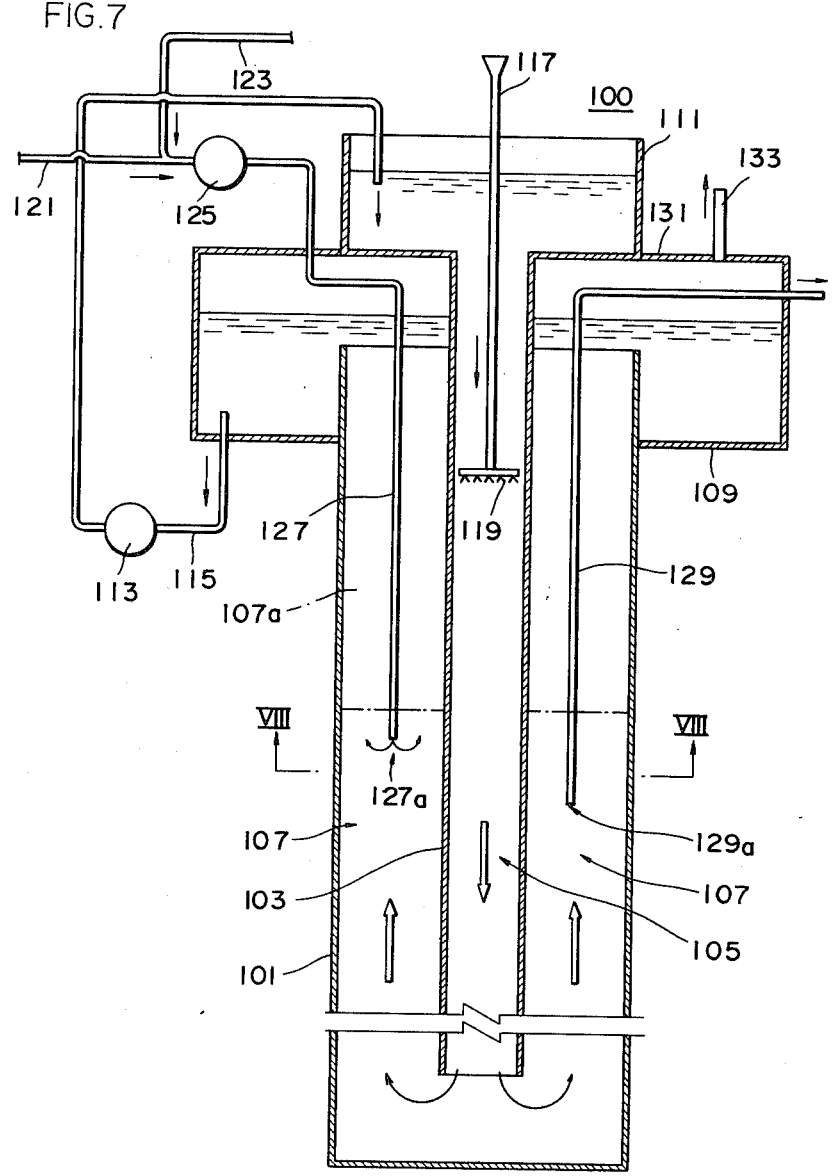

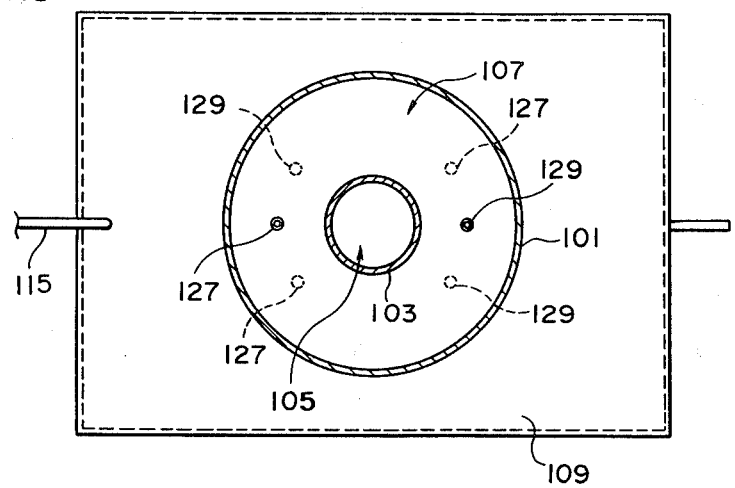
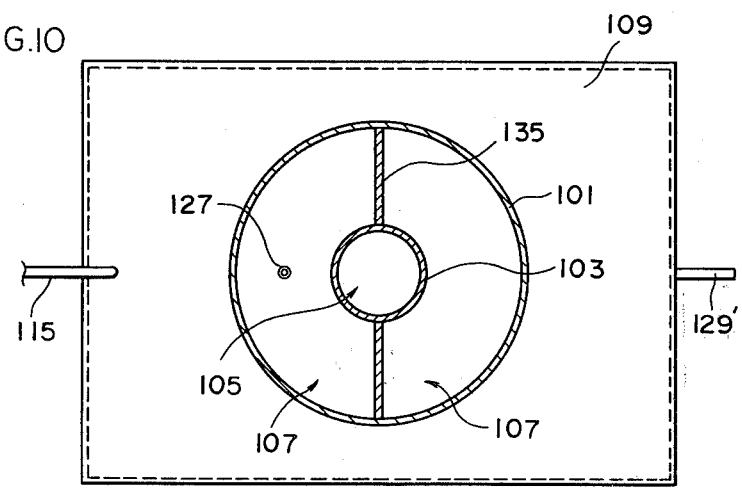

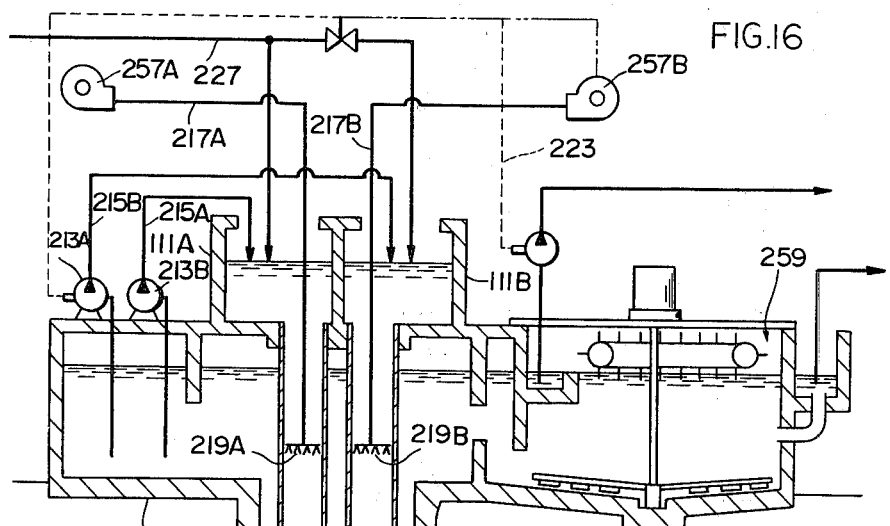
FIG.16
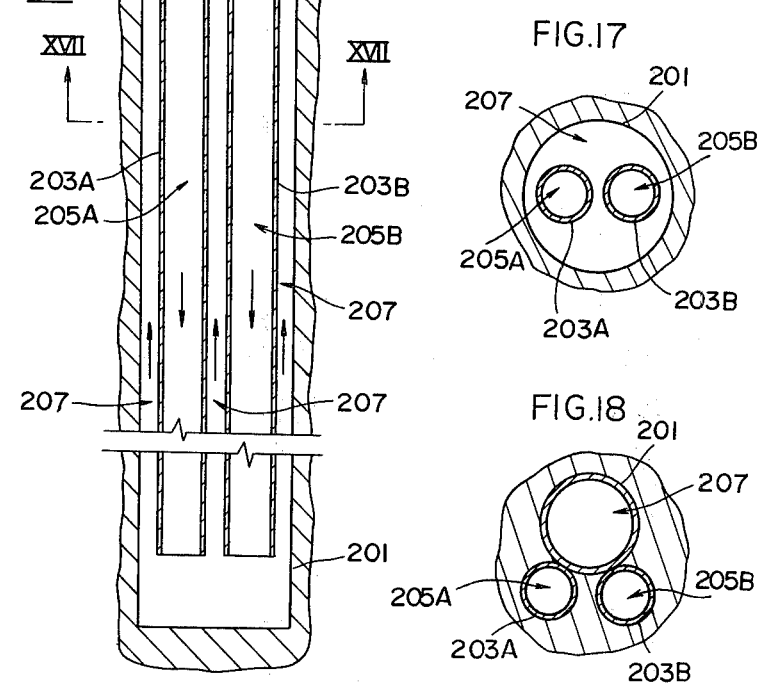
FIG.17
FIG.18

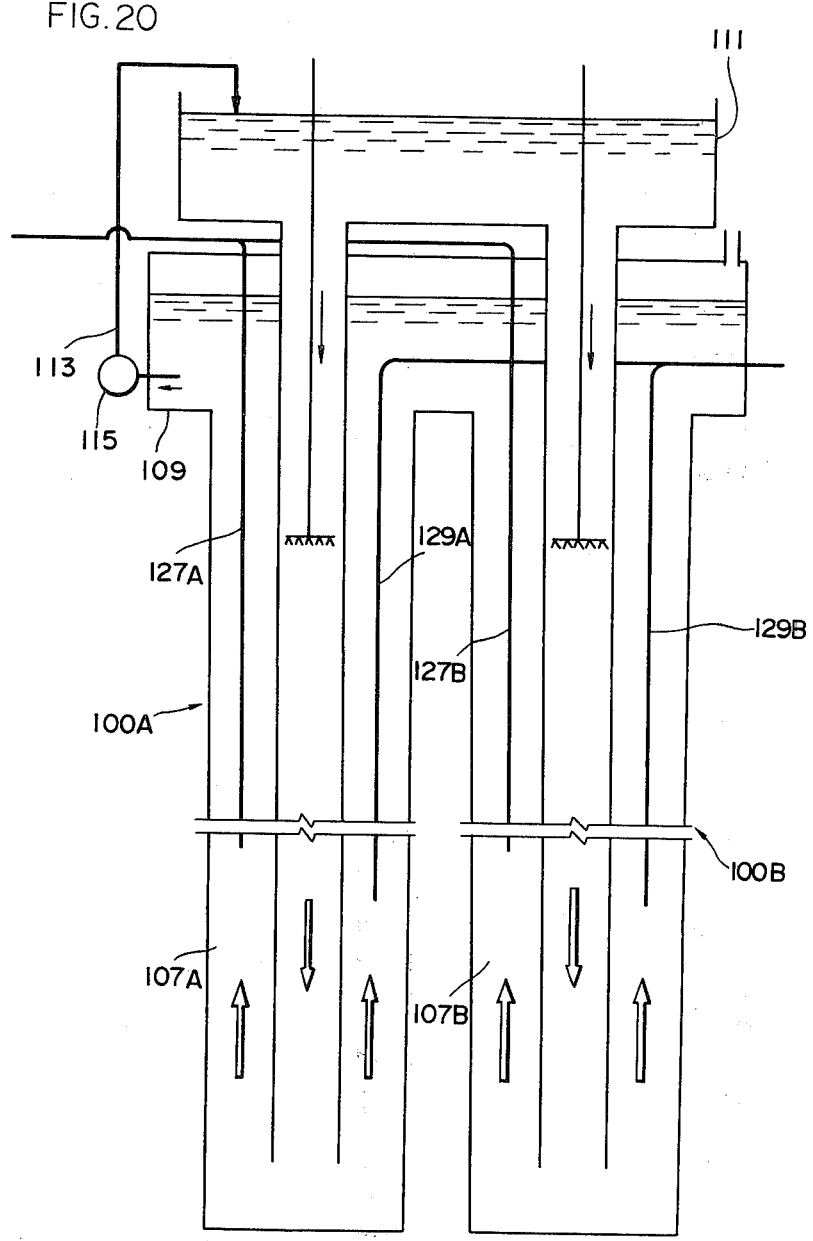

WASTE WATER TREATING APPARATUS

BACKGROUND OF THE INVENTION

1. Field of the Invention

The present invention generally relates to a waste water treating apparatus. More specifically, the present invention relates to a waste water treating apparatus for purifying domestic waste water or industrial waste water containing organic matter and ammonium nitrogen by treatment with microorganisms.

2. Description of the Prior Art

A general approach for treating waste water comprises a primary treating step for physically removing suspended matter of a given size from the waste water and a secondary treating step for removing organic matter by a biological process. The present invention is directed to an improvement in the secondary processing step.

Waste water being treated in the above described secondary treating step comprises organic matter including protein, fat, carbohydrate, amino acid or the like and nitrogen or the like. In order to perform the above described secondary treating step of nitrogen containing waste water, a conventional approach first removes the BOD material biochemical oxygen demand through decomposition thereof, which is followed by an oxidation of ammonium nitrogen for conversion into ions of nitrite or nitrate, which is further followed by denitrification by adding an organic carbon source such as methanol or the like under a reduction atmosphere having a low concentration of oxygen.

FIG. 1 is a flow diagram showing a conventional example of a most fundamental waste water treating apparatus utilizing a biological denitrification method, which constitutes the background of the invention. Referring to FIG. 1, waste water containing organic matter and nitrogen and having suspended matters removed is supplied into a nitrification tank 1. The organic nitrogen and ammonium nitrogen ($NH_4$-N) contained in the waste water is oxidized in the nitrification tank 1 by means of a nitrifying microorganism and oxygen to produce nitrite nitrogen ($NO_2$-N) or nitrogen ($NO_3$-N). The waste water thus subjected to nitrification, i.e. a mixed liquor, is fed from the nitrification tank 1 to a denitrification tank 2. In the denitrification tank 2 nitrogen ($N_2$) is separated by means of respiration of a denitrifying microorganism. The nitrogen thus separated is discharged into the atmosphere in the form of a gas. A treated water thus denitrified in the denitrification tank 2 is further introduced into a precipitation tank 3. The treated water is separated in the precipitation tank 3 into an activated sludge and water. The treated water from the precipitation tank 3 is subjected to primary type process or it is discharged out of the system after being subjected to a chlorine sterilization. A portion of the activated sludge obtained in the precipitation tank 3 is returned so that the same is introduced into the nitrification tank 1 together with the waste water.

FIG. 2 is a flow diagram showing another conventional example which also constitutes the background of the invention. The apparatus of FIG. 2 differs from that of FIG. 1 in that in FIG. 2 the apparatus additionally comprises a BOD oxidation tank 4 interposed between the denitrification tank 2 and the precipitation tank 3. The apparatus of FIG. 2 is disclosed in Japanese Patent Publication No. 31226/1974 published for opposition Aug. 20, 1974, for example. The BOD oxidation tank 4 functions to oxidize the remaining BOD material with a BOD oxidizing microorganism, thereby to stabilize the treated water quality of water discharged from the precipitation tank 3.

Any of the above described two conventional approaches requires separate tanks for both the nitrification and denitrification processes. Accordingly, these conventional approaches necessitate large scale facilities including separate tanks of large capacity, which accordingly require a site of a large area for installation. In addition, in the nitrification tank 1 ammonium nitrogen is oxidized to produce nitrate or nitrite, with the result that the pH value is considerably decreased. When exposed to a lower pH value a nitrifying microorganism is much less active and it becomes necessary to add alkalis such as caustic soda for adjusting the pH value. Furthermore, since a heterotrophic microorganism is generally utilized as a denitrifying microorganism in the denitrification process, it is necessary to add a large amount of an organic carbon source such as methanol. Accordingly, the cost for running such facilities has become expensive.

Japanese Patent Publication No. 38357/1975 laid open for public inspection on Apr. 9, 1975 proposes a modification of the approach shown in FIG. 1, in which a plurality of stages for the nitrification tanks and for the denitrification tanks are provided, so that the dose of a pH value adjusting agent such as caustic soda is reduced as much as possible. The approach disclosed in Japanese Patent Publication No. 38357/1975 aims at reducing as much as possible the use of an alkali for neutralizing by repeating the nitrification and denitrification, thereby to reduce the running costs and the concentration of the salt groups in the treated water. However, the above described modification of the approach shown in FIG. 1 still requires large scale facilities. In addition, the above described modification of the FIG. 1 approach still requires a dosage of organic carbon such as methanol in the denitrification process just as in FIGS. 1 and 2, whereby the operating costs cannot be sufficiently reduced.

FIG. 3 is a flow diagram showing a further conventional example also forming part of the background of the invention. The example of FIG. 3 is disclosed in Japanese Patent Publication No. 113047/1975 laid open for public inspection on Sept. 4, 1975. The conventional example of FIG. 3 has eliminated the shortcoming involved in the above described conventional examples that a large amount of organic carbon source such as methanol need be dosed in the denitrification process, whereby the amount of an external hydrogen donor has been reduced as much as possible. Briefly described, the example of FIG. 3 is characterized by a first denitrification tank 2a and a second denitrification tank 2b respectively located upstream and downstream of the nitrification tank 1. The BOD substance contained in the waste water is oxidized to be decomposed in the first denitrification tank 2a by means of nitrite and nitrate respiration. Accordingly, the required amount of oxygen in the nitrification tank 1 is correspondingly decreased. A portion of the mixed liquor flowing out from the nitrification tank 1 is returned to the first denitrification tank 2a. The remaining nitrite nitrogen and nitrate nitrogen are fully reduced to be decomposed in the second denitrification tank 2b. The activated sludge obtained from the precipitation tank 3 is returned to the second denitrification tank 2b. The conventional example of FIG. 3 makes it possible to dispense with or to reduce the dose of the hydrogen donor or of the organic carbon to an extremely small amount for the denitrification process, which accordingly decreases the operating costs. However, even the conventional example of FIG. 3 still requires at least one nitrification tank and two denitrification tanks, with the resultant problem that facilities of a large scale are involved. In addition, even the conventional example of FIG. 3 cannot fully remove the BOD component in the first denitrification tank 2a, with the result that a large amount of the remaining BOD component enters into the nitrification tank 1. Therefore, the BOD oxidizing microorganism increases and accordingly the sludge amount increases, which decreases the average residence time period of the sludge and also decreases the rate of inclusion of the nitrifying microorganism in the sludge, whereby it becomes difficult to maintain the nitrifying microorganism in the nitrification tank, particularly at a lower temperature. In order to maintain the nitrifying microorganism under such condition, it becomes necessary to increase the capacity of the nitrification tank 1.

FIG. 4 is a flow diagram showing still another conventional example providing further background of the invention. The conventional example of FIG. 4 is disclosed in Japanese Patent Publication No. 79573/1977 laid open for public inspection of July 4, 1977. FIG. 4 is characterized by an oxidation tank 5 between the first denitrification tank 2a and the nitrification tank 1. The remaining BOD component is removed from the oxidation tank 5, thereby to decrease the BOD component entering into the nitrification tank 1. Although the conventional example of FIG. 4 can enhance the denitrification efficiency, the same requires a further separate tank and accordingly involves a problem that the facilities become unavoidably large.

FIG. 5 is a flow diagram of yet another conventional example providing further background of the invention. The conventional example of FIG. 5 is disclosed in Japanese Patent Publication No. 42850/1979 laid open for public inspection on Apr. 5, 1979. The conventional example of FIG. 5 is owned by the assignee of the present invention and has been marketed under the trademark "Kubota Nitrocycle System". The conventional system of FIG. 5 comprises an aerobic digestion tank 6 located upstream of an aeration and nitrification tank 1 and a reaeration tank 1a located between the denitrification tank 2 and the precipitation tank 3. Not only a portion of the mixed liquor flowing out from the aeration tank 1 but also the activated sludge from the precipitation tank 3 are returned to the aeorobic digestion tank 6. The conventional system of FIG. 5 functions such that the BOD oxidation and nitrification take place simultaneously through processing of the activated sludge in the aerobic digestion tank 6 and in the aeration an nitrification tank 1, for removing a major portion of the total nitrogen (T-N) contained in the waste water and to denitrify the nitrite nitrogen and the nitrate nitrogen in the denitrification tank 2. Accordingly, the conventional system of FIG. 5 makes it possible to drastically reduce the dosage of an alkali (caustic soda) for the nitrification process and the dosage of the organic carbon source (methanol) in the denitrification process. However, the conventional system of FIG. 5 also requires a large supply amount of oxygen containing gas (air) in the aeration tank 1. On the other hand, the efficiency of supplying oxygen into an aeration tank having a depth of 4 to 5 m which is commonly utilized is 5 to 10% at the most and therefore there is a limit to the concentration of the activated sludge that can be maintained in the tank. Recently a circulation type aeration tank having a long path in the vertical direction has been developed to enhance the efficiency of supplying oxygen, in which the oxidizing decomposition and nitrification of the BOD have been considerably improved. However, it is still necessary to carry out the denitrification in a separate reaction tank and accordingly there is room for a fundamental improvement in the implementation of the facilities of small size, and to increase the processing efficiency, as well as reduce the operating costs and the surface area for installing the plant.

SUMMARY OF THE INVENTION

Briefly described, the present invention comprises a waste water treating apparatus having a mixed liquor circulating path including an aeration tank of a deep well type, wherein a portion of the aeration tank constitutes a nitrification zone and another portion of the aeration tank constitutes a low dissolved oxygen concentration zone or a denitrification zone. The aeration tank comprises a downward flow chamber extending in the depth direction and an upward flow chamber also extending in the depth direction in association with the downward flow chamber, and a circulation means provided between the downward flow chamber and the upward flow chamber. An oxygen containing gas is supplied to the downward flow chamber. As a result, the mixed liquor being circulated through the circulation path is BOD oxidized and is further nitrified. A waste water supply means supplies waste water into the upward flow chamber at a given supply position or level in the depth direction of the upward flow chamber, whereby a low dissolved oxygen concentrating zone or a denitrification zone is formed above the supply level of the upward flow chamber. The mixed liquor previously nitrified is denitrified in the denitrification zone.

According to the present invention, both a nitrification process and a denitrification process can be achieved substantially in a single tank, although conventional waste water processing devices comprised separate tanks of large capacity for the nitrification denitrification processes, respectively. Therefore, the present invention substantially reduces the size of the facilities and reduces the area of a site where the apparatus is installed and further drastically reduces installation costs. Since a circulation aeration tank of a deep well type is employed, an ample amount of oxygen required for both the BOD oxidation and the nitrification processes can be supplied. Accordingly, more of an oxidizing microogrganism and of a nitrifying microorganism can be activated and the amount or concentration of an activated sludge that can be maintained in the tank can be drastically increased. More specifically, conventional systems achieved a supply efficiency of oxygen as high as 5 to 10% at the most, whereas the present invention enhances the same up to 70 to 80%. Therefore, the processing efficiency is not limited to an oxygen supply efficiency, as in the prior art so that the processing efficiency of the present invention can be drastically enhanced. In addition, since the present invention is adapted to circulate a mixed liquor such that the nitrification process and the denitrification process are achieved substantially in one tank, the dosage of amount of alkali (caustic soda or the like) for controlling the pH value required in a conventional apparatus can be drastically reduced. Accordingly, the running cost can be considerably decreased. Furthermore, since the circulation of the mixed liquor according to the invention is achieved in such a manner that the nitrification process and the denitrification process are carried out substantially in one tank, an organic carbon source or a hydrogen donor required in the denitrification process is supplied by the waste water itself. Accordingly, it is not necessary to provide a large dose of organic carbon from an external source as is the case in conventional systems. In fact, according to the invention the dosage of an organic carbon from an external source may be very small or even zero. For this reason, the operating costs are substantially reduced as compared to the prior art.

In a preferred embodiment of the present invention, a mixed liquor denitrified in the denitrification zone of the single aeration tank is fed to a separator or a final precipitation tank. At least a portion of the activated sludge separated in the separator or the precipitation tank is returned so that the same is supplied to the upward flow chamber together with the waste water. By thus supplying the return sludge together with the waste water, such a denitrification zone can be readily attained. More specifically, oxygen ($O_2$) is consumed by respiration of the sludge at the rate of 10 to 20 mg.$O_2$/g.SS.hr in the case of treating ordinary sewer sludge. Assuming that the sludge concentration is, for example, 10,000 mg.SS/$\alpha$, then the consumption amount of oxygen is 100 to 200 mg.$O_2$/$\alpha$.hr. Therefore, according to this embodiment, the dissolved oxygen in the upward flow chamber in the vicinity of the supply port of the waste water and return sludge is instantaneously consumed. Therefore, even if an ample ample amount of oxygen for the nitrification processes is supplied, readily and promptly a low dissolved oxygen concentration zone or a denitrification zone (a reduction zone) can be attained.

In another preferred embodiment of the present invention, the level for the supply or introduction of the waste water and the return sludge may be changed. By changing the supply level or position, the waste water can be treated with a better efficiency. More specifically, a chemical property such as the degree of nitrification of the mixed liquor being circulated along the mixed liquor circulating path, is measured and the supply level or position is changed depending on the measurement. In this manner the length of the mixed liquor circulating path most suited for the nitrification process and the denitrification process can be selected and hence the processing efficiency can be further enhanced. For example, the degree of nitrification, for example the concentration of nitrite nitrogen and nitrate nitrogen is measured at any position or level of the upward flow chamber and the waste water (and the return sludge) is supplied at that position or level where the nitrification has progressed to, for example, 90 to 95 %.

In a further preferred embodiment of the present invention, the amount of the waste water and/or the return sludge being supplied to the upward flow chamber may be changed. A chemical property of the mixed liquor, for example the dissolved oxygen concentration, is measured at the position or level of the mixed liquor circulating path and then the amount being supplied is changed depending thereon. In this manner the waste water treatment can be carried out with a higher efficiency. The dissolved oxygen concentration or the oxidation-reduction potential is mesured at the upper portion of the upward flow chamber, i.e. at the position where the denitrification process has been substantially completed. In the case where the dissolved oxygen concentration is larger than 1 ppm, preferably larger than 0.5 ppm, or the oxidation-reduction potential is larger than 0 mV, preferably larger than $-150$ mV, the supply volume of the waste water and/or the return sludge is increased.

In still a further preferred embodiment of the present invention, several downward flow chambers are connected to a common upward flow chamber. The respective downward flow chambers receive a supply of the oxygen containing gas, respectively. By selectively rendering effective one or more of a plurality of downward flow chambers as necessary, waste of energy can be prevented. In addition, by measuring the chemical property of the mixed liquor at any position or level of the mixed liquor circulating path and by changing the number of the downward flow chambers being rendered effective depending on the measurement, the waste water treatment can be carried out with a higher efficiency. For example, the amount of organic matter and/or the amount of nitrogen contained in the waste water is measured and a larger number of the downward flow chambers may be rendered effective when the measurement exceeds a predetermined value. The degree of nitrification expressed as the concentration of the nitrite nitrogen and the concentration of the nitrate nitrogen or the dissolved oxygen concentration may measured in the vicinity of the waste water supply position or level and/or of the return sludge in the upward flow chamber. If and when the degree of nitrification is smaller than say 90 to 95 % or the dissolved oxygen concentration is smaller than 1.5 ppm, preferably smaller than 2 ppm, a larger number of downward flow chambers may be rendered effective.

A circulation type aeration tank of a deep well type for use in the present invention comprises a downward flow tube constituting a downward flow chamber and an upward flow tube constituting an upward flow chamber for circulation of a mixed liquor extending substantially in a vertical direction, and reserve tanks located at the upper end of the downward flow tube and the upward flow tube, respectively. The downward flow tube and the upward flow tube communicate with each other at the lower end of both tubes and the respective reserve tanks of the downward flow tube and the upward flow tube are coupled to each other through a forced circulation path. Generally, the upward flow tube has a larger diameter and the lower end thereof is closed with a bottom plate and the downward flow tube of a smaller diameter is inserted into the upward flow tube, so that a double concentric tube is formed comprising the downward flow chamber and the upward flow chamber. According to another example, one or more partitions are formed in a tube of a large diameter and one or more of the partitioned chambers are used as the downward flow chamber while the remaining chambers are used as the upward flow chamber. The transversal sectional shape of the downward flow chamber and the upward flow chamber may be properly selected, such as circular, square, or the like.

The aeration tank is provided with a means for supplying an oxygen containing gas, generally air, to the mixed liquor being circulated through the downward flow chamber. liquor being circulated through the downward flow chamber. A gas supply pipe for supplying the oxygen containing gas is inserted into the downward flow chamber from above and is opened at the upper end of the downward flow chamber. As necessary, a gas disperser may be provided at the opening of the gas supply pipe. The other end of the gas supply pipe is directly coupled to a blower for a forced air supply or is opened to a gas reservoir or to the atomosphere. In most cases, the gas supply pipe need not be provided with a prime mover for the forced supply of gas, because the gas from the gas supply pipe is forcedly withdrawn due to the flow of the mixed liquor flowing downwardly through the downward flow chamber. The opening position (the gas supply position) in the downward flow chamber is preferably set to be at an upper level so that the depth necessary for carrying gas bubbles with the mixed liquor is maintained. The higher the opening position or level is located, the longer the time period of contact of the gas bubbles with the mixed liquor and the better the dissolving efficiency of oxygen.

Means are provided for withdrawing the mixed treated liquor or the treated water from the aeration tank. The treated water being discharged from the circulation system need be a mixed liquor in which the oxidation process has progressed to the extent before the mixed liquor being circulated flows into the above described reduction zone of a low dissolved oxygen concentration. Therefore, the withdrawing means are preferably arranged for withdrawing the mixed liquor from a position or level lower than that of the supply of the waste water the return sludge into the upward flow chamber. Alternatively the mixed liquor is preferably withdrawn from the reserve tank at the upper portion of the downward flow chamber through the circulation pump after completing the reaction at the reduction zone. According to yet another preferred possibility the mixed liquor is withdrawn from the circulation path at the outlet side of the circulation pump in order to prevent the waste water from being shortcircuited.

According to the waste water treating method of the invention, the waste water is supplied midway into the circulation of the mixed liquor through the circulation system while a portion of the mixed, treated liquor is caused to flow out whereby the mixed liquor is continually treated in circulation. It is important to provide a high dissolved oxygen concentration zone which is required for the decomposition and removal of BOD from the mixed liquor and for nitrifying a nitrogen compound such as ammonia. A low dissolved oxygen concentration zone is provided for the reduction and removing of a nitrified nitrogen component. All zones are operated under a suitable operating condition.

According to the present invention, an oxygen containing gas supplied from the upper portion of the downward flow chamber is caused to flow down together with the mixed liquor along the downward flow chamber, while oxygen is dissolved into the mixed liquor, so that an aerobic oxidation zone containing sufficient oxygen is formed in the downward flow chamber and up to midway of the upward flow chamber. In such a case, it is preferred that the dissolved oxygen concentration in the mixed liquor is larger than 1.5 ppm and more preferably larger than 2 ppm. In that zone the organic matter in the mixed liquor is decomposed through an oxidizing reaction by means of the oxygen and the aerobic microorganism (oxidizing microorganism) in the mixed liquor, while the nitrogen contained in the mixed liquor is nitrified by the nitrifying microorganism.

The dissolved oxygen in the mixed liquor is gradually consumed through the above described oxidizing reaction and the dissolved oxygen concentration decreases as the mixed liquor flows upwardly along the upward flow chamber.

The mixed liquor subjected to nitrification as described above is then subjected to a reduction (denitrification) as a function of the action of a denitrifying microorganism, whereby the nitrogen component in the mixed liquor is turned to a nitrogen gas, which is then discharged. For a better activity of a denitrifying microorganism for use in the above described reduction, preferably the dissolved oxygen is maintained as much as possible and a supply of the carbon source is required. Accordingly, waste water is supplied from the lower portion of the reduction zone forming a reduction zone for performing a nitrification at the upper portion of the upward flow chamber following the oxidation zone up to midway of the upward flow chamber where the dissolved oxygen concentration has been decreasing in the circulation system, i.e. at the upper portion above the described midway portion. In order to effectively achieve reduction, it is necessary that the dissolved oxygen concentration in the reduction zone be smaller than 1 ppm and preferably smaller than 0.5 ppm.

Accordingly, in order to control the dissolved oxygen concentration so that it is smaller than 1 ppm and perferably smaller than 0.5 ppm in the circulation system above the waste water supply port defined as the reduction zone in the present invention, the separation is carried out in the final precipitation tank or in the flotation tank apart from a mere supply of the waste water and the return portion of the sludge is supplied together with the waste water to the aeration tank. Thus, the treatment is carried out more efficiently.

In order to more effectively carry out the reduction, it is necessary to assure a uniform mixture of the mixed liquor flowing upwardly along the chamber with the waste water. To that end, means is preferably provided immediately above the supply level or position of the waste water for mixing both the waste water and the mixed liquor. The mixing means may comprise a plurality of fins for causing a turning flow, a static mixer, or the like. In order to cause reduction, it is necessary to interrupt the contact of the mixed liquor above the upward flow chamber from the air and therefore the reserve tank of the upward flow chamber is closed by a top plate, so that the nitrogen gas produced through reduction is exhausted through an exhausting aperture provided in the top plate thereof.

Accordingly, a principal object of the present invention is to provide a waste water treating apparatus that can be made to have a smaller size as compared to the prior art.

Another object of the present invention is to provide a waste water treating apparatus, in which a treatment efficiency has been enhanced.

A further object of the present invention is to provide a waste water treating apparatus, wherein both the installation costs and the running or operating costs have been drastically decreased.

Still a further object of the present invention is to provide a waste water treating apparatus, wherein both a nitrification process and a denitrification process are carried out using one circulation aeration tank of a deep well type.

These objects and other objects, features, aspects and advantages of the present invention will become more apparent from the following detailed description of the present invention when taken in conjunction with the accompanying drawings.

BRIEF DESCRIPTION OF THE DRAWINGS

FIG. 7 is a longitudinal sectional view showing the structure of one embodiment of the present invention;

FIG. 8 is a transversal sectional view taken along the line VIII—VIII in FIG. 7;

FIG. 10 is a transversal sectional view taken along the line X—X in FIG. 9;

FIG. 16 is a longitudinal sectional view showing one example of an aeration tank having a plurality of downward flow chambers which may be used in the present invention;

FIG. 17 is a transversal sectional view taken along the line XVII—XVII in FIG. 16;

FIG. 18 is a transversal sectional view similar to FIG. 17 showing a different example of the flow chamber;

FIG. 20 is a longitudinal sectional view showing a structure of yet another embodiment of the present invention.

DESCRIPTION OF THE PREFERRED EMBODIMENTS

Figure 1:
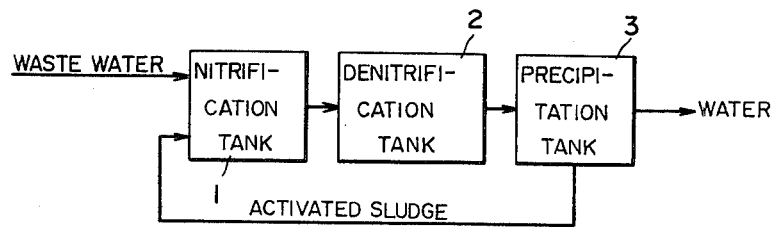
FIGS. 1 to 5 are flow diagrams each showing a different conventional example which constitutes background information for the present invention.
Figure 2:
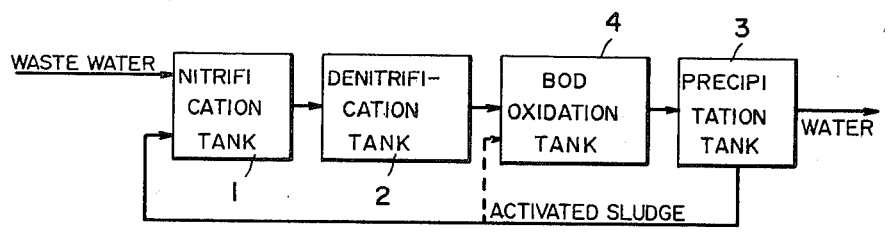
Figure 3:
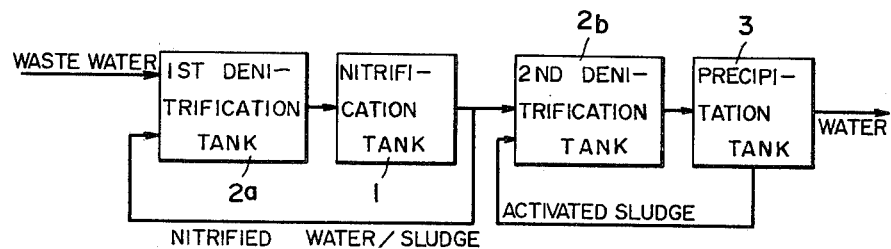
Figure 4:
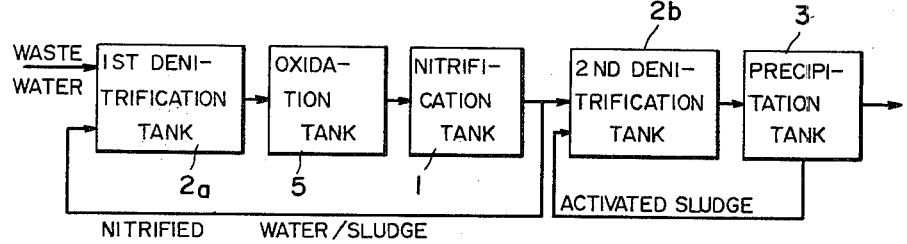
Figure 5:
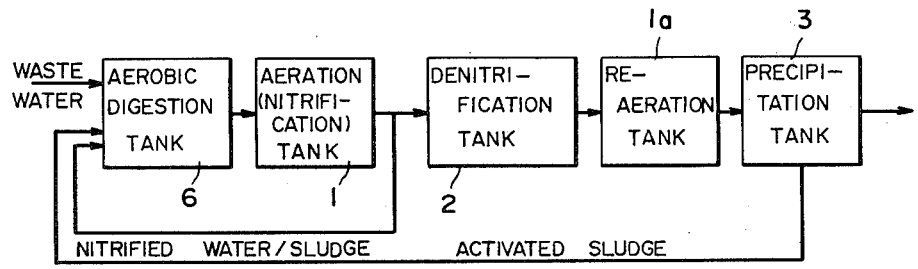
Figure 6:
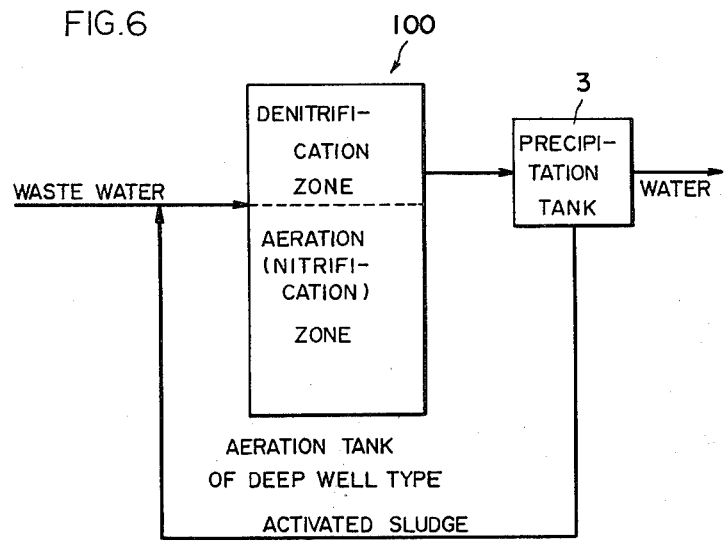
FIG. 6 is a flow diagram for explaining the principle of the present invention.

FIG. 6 is a flow diagram for explaining the principle of the present invention. The present invention is adapted to carry out a nitrification process and denitrification process in a single aeration tank 100. The aeration tank 100 may be an aeration tank of a deep well type such as disclosed in a copending U.S. Patent Application, Ser. No. 239,418, assigned to the same assignee as the present invention, now U.S. Pat. No. 4,376,701. Although described in detail below, the aeration tank 100 of a deep well type comprises an upward flow chamber and a downward flow chamber extending substantially in the vertical direction. Both chambers are in fluid communication with each other at the upper portions thereof and at the lower portions thereof, respectively, whereby a circulation type aeration tank is formed. A partial zone of the circulation type aeration tank is used as a BOD oxidation and nitrification zone and another partial zone is used as a denitrification zone or a reduction zone of a low dissolved oxygen concentration. To that end, waste water and a return sludge portion are is supplied to a given position or depth level of the upward flow chamber, not shown. Accordingly, the dissolved oxygen is rapidly consumed at the portion above the above described position or level in the upward flow chamber, whereby a denitrification zone is formed. The mixed liquor which has undergone the nitrification process and denitrification process by means of the circulation type aeration tank 100, is supplied into a precipitation tank 3 which is an example of a post treatment means. Treated water is separated in the precipitation tank 3 and the liquid, i.e. treated water is discharged, while the solid, i.e. an activated sludge is deposited at the bottom thereof and is removed therefrom. The activated sludge removed from the precipitation tank 3 is partially or wholly returned to the aeration tank 100 so that the same is supplied into the upward flow chamber together with a waste water.

FIG. 7 is a longitudinal sectional view showing a structure of one embodiment of the present invention. FIG. 8 is a transversal sectional view taken along the line VIII— VIII in FIG. 7. The embodiment of FIG. 7 uses a circulation type aeration tank of a deep well type, as is the case in the embodiments described below. The aeration tank 100 comprises an outer tube or an upward flow tube 101 extending to an underground depth up to 100 m. The upward flow tube 101 is constructed as a cylinder with a bottom. An inner tube or a downward flow pipe 103 of a smaller diameter is disposed inside the upward flow tube 101. The downward flow tube 103 constitutes a downward flow chamber 105 for flowing downwardly therethrough a mixed liquor being treated. An upwardly flow chamber 107 for flowing upward therethrough the mixed liquor being treated is formed between the upward flow tube 101 and the downward flow tube 103.

A reserve tank 109 is mounted in fluid communication with the upward flow chamber 107 at the upper end of the upward flow tube 101. A reserve tank 111 is mounted in fluid communication with the downward flow chamber 105 at the upper end of the downward flow tube 103 so as to be positioned at a higher level than the reserve tank 109. The reserve tank 109 of the upward flow chamber 107 and the reserve tank 111 of the downward flow chamber 105 are communicated with each other through a circulation pipe 115 having a circulation pump 113. Thus a circulating path is formed for the mixed liquor.

The mixed liquor in the above described circulating path is circulated by means of the circulation pump 113 through the following path including the reserve tank 109 - the circulation pipe 115 - the reserve tank 111 - the downward flow chamber 105 - the upward flow chamber 107 - and back into the reserve tank 109 as shown by the arrows. In this case, driving of the circulation pump 113 establishes a head of the mixed liquor in the reserve tanks 109 and 111 and the mixed liquor in the circulating path is caused to naturally flow therethrough.

A gas supply pipe 117 communicated with an air source at one end is inserted into the upper portion of the downward flow chamber 105. The other end of the gas supply pipe 117 is formed as a mere opening or is provided with a gas disperser 119, as shown. As the mixed liquor flows through the circulating path, the oxygen containing gas (air) from the gas supply pipe 117 is mixed into the mixed liquor and is brought from the downward flow chamber 105 to the upward flow chamber 107.

The waste water is supplied through a waste water supply pipe 121 connected to a pipe 123 for supplying a return sludge portion from a precipitation tank, not shown. Accordingly, the waste water from the pipe 21 and the return sludge from the pipe 123 are all controlled together by the pump 125 to flow into the upward flow chamber 107 through the supply pipe 127 and the supply port 127a. Although the pump 125 may be a constant capacity pump, preferably the same is a variable capacity pump. The circulation pump 113 in the circulation pipe 115 is also preferably a variable capacity pump. By properly selecting the position of the supply port 127a of the supply pipe 127, a low dissolved oxygen concentration zone, i.e. a reduction zone or a denitrification zone 107a is formed above the supply port 127a in the upward flow chamber 107.

A flow out pipe 129 for flowing out the mixed, treated liquor (treated water) in the circulating path is inserted into the upward flow chamber 107 with an outlet 129a at the lower end of the pipe 129. The position in the depth direction of the inlet 129a of the pipe 129 is selected to be at a lower level by more than a predetermined distance say by more than 50 cm than the supply port 127a of the supply pipe 127. The reason is that a portion of the mixed liquor treated before the waste water supplied by the supply pipe 127 and/or the return sludge are mixed, is to flow out from the flow out pipe 129.

The reserve tank 109 and thus the upward flow chamber 107 are closed with a top plate 131. An exhausting aperture 133 for exhausting a nitrogen ($N_2$) gas produced in the denitrification process, is provided in the top plate 131.

The mixed liquor being treated is circulated through the above described path in the above described circulating path thus formed. An oxygen containing gas such as air is supplied through the pipe 117 and the air disperser 119 into the downward flow chamber 105 and oxygen is dissolved into the mixed liquor flowing therethrough. Accordingly, the downward flow chamber 105 becomes an aerobic zone. In the aerobic zone the organic carbon contained in the mixed liquor is oxidized to be decomposed, while nitrogen such as ammonium nitrogen ($NH_4$-N) is oxydized to produce nitrite nitrogen ($NO_2$-N) or nitrate nitrogen ($NO_3$-N) as a result of the action of a nitrite microorganism or of a nitrate microorganism. More specifically, the mixed liquor undergoes a nitrification process as it flows through the downward flow chamber 105. The above described nitrification could proceed more than a given degree, say 90 to 95%, in the downward flow chamber 105. However, generally nitrification took place even in the lower portion of the upward flow chamber 107. However, in the case of an aeration tank of a deep well type as is used according to the invention, an ample amount of oxygen ($O_2$) can be supplied and accordingly the aeration is carried out more efficiently.

The waste water and the return sludge are supplied through the supply port 127a into the upward flow chamber 107. The dissolved oxygen in the mixed liquor being treated is rapidly consumed by the waste water and the return sludge thus supplied and accordingly the zone 107a above the supply port 127a is formed as a low dissolved oxygen concentration or anaerobic zone, i.e. a reduction zone or a denitrification zone. In the upward flow chamber 107 the waste water and the return sludge are supplied after the dissolved oxygen is almost used up by the oxidizing decomposition of organic carbon and nitrification of nitrogen and therefore the low dissolved oxygen concentration zone 107a is rapidly formed. In particular, in the case where the return sludge is supplied, the dissolved oxygen is instantaneously consumed due to respiration of the sludge. For example, in the nitrification zone the dissolved oxygen concentration in the mixed liquor is more than 1.5 ppm and preferably more than 2 ppm, whereas the dissolved oxygen concentration in the mixed liquor at the denitrification zone is smaller than 1 ppm and preferably smaller than 0.5 ppm. The supply level of the waste water and the return sludge, i.e. the level of the supply port 127a in the depth direction in the upward flow chamber 107 must be selected to be an optimal position depending on the amount of the waste water being supplied and the oxygen taking into consideration the above described dissolved oxygen concentration and the degree of nitrification.

The FIG. 7 embodiment is constructed so that the supply pipe 127 and the flow out pipe 129 are each formed as one pipe. However, as shown by the dotted line in FIG. 8, a plurality of pipes may be provided for each of the supply pipe 127 and the flow out pipe 129. The manner of arrangement of a plurality of pipes is not limited to that shown in FIG. 8.

Figure 9:
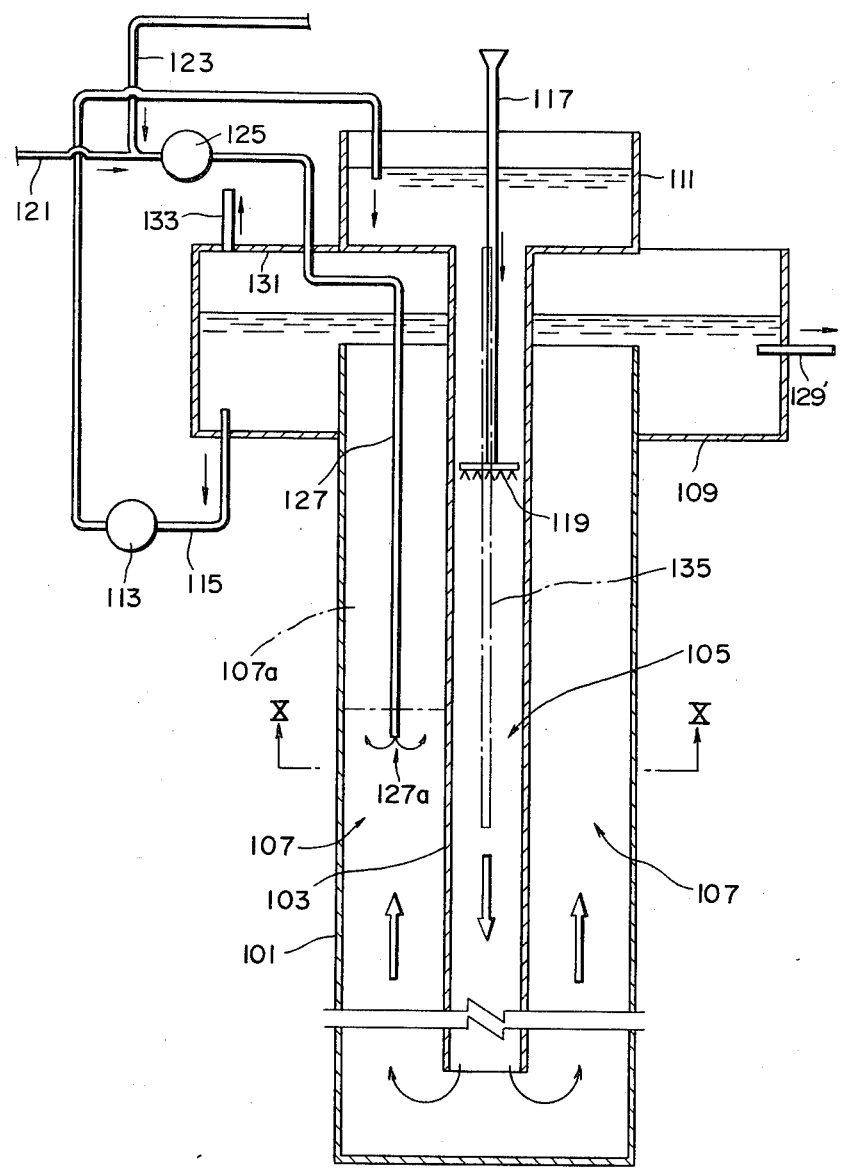
FIG. 9 is a longitudinal sectional view showing the structure of another embodiment of the present invention.

FIG. 9 is a longitudinal sectional view showing a structure of a further embodiment of the present invention. FIG. 10 is a transversal sectional view taken along the line X—X in FIG. 9. The embodiments shown in FIGS. 9 and 10 employ a circulation type aeration tank 100 of a deep well type similar to the embodiment shown in FIGS. 7 and 8. However, in the embodiment of FIG. 9 the flow out pipe serving as a treated water withdrawing means is not inserted into the upward flow chamber 107. Instead, a partition 135 divides the flow path at the upper portion of the upward flow chamber 107 as best seen in FIG. 10. The partition 135 reaches down to a level slightly lower than the supply port 127a of the supply pipe 127 as best seen in FIG. 9. The partition also divides the reserve tank 109. The reserve tank portion on the side of one flow chamber where the supply pipe 127 is inserted, is enclosed at the top thereof with the top plate 131 where an exhausting aperture 133 is formed. The reserve tank portion on the other flow chamber is open at the top thereof. The flow out pipe 129' is provided in the side of the reserve tank 109. Accordingly, the mixed liquor flowing through the upward flow chamber 107 is divided into two flow portions by means of the partition 135 and the mixed liquor being treated entering into one flow chamber is mixed with the waste water and the return sludge, whereby the reduction zone 107a is formed, while the mixed liquor entering into the other flow chamber enters into the opposite side of the reserve tank 109, without being mixed with the waste water and the return sludge, whereupon the same flows out of the circulating path through the flow out pipe 129'.

Although an illustration is omitted, a flow out pipe may be connected to the circulation pipe 115 at the output side of the circulation pump 113, so that a portion of the mixed liquor flowing through the circulation pipe 115 may be withdrawn. Alternatively, the apparatus may be constructed so that the mixed liquor treated from the circulation pipe 115 may be withdrawn from the reserve tank 111 at the upper portion of the downward flow chamber 105.

Figure 11:
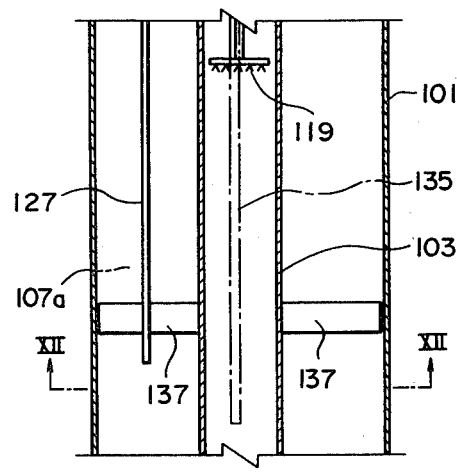
FIG. 11 is a longitudinal sectional view of a major portion showing one example of the mixing means.
Figure 12:
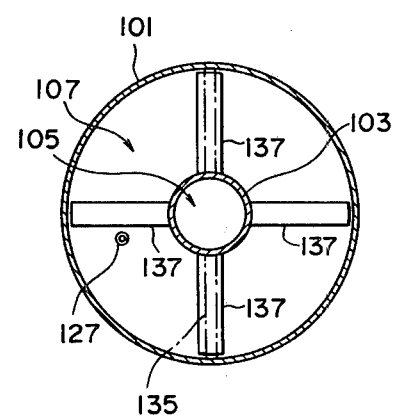
FIG. 12 is a transversal sectional view taken along the line XII—XII in FIG. 11.

FIGS. 11 to 113 are longitudinal and transversal sectional views showing a major portion of an example of a means for uniformly mixing the mixed liquor being circulated with the waste water. The embodiments shown in FIGS. 11 and 12 comprise a plurality of fins 137 extending in the radial direction of the downward flow tube 103. The fins 137 cause a turning or rotating flow, whereby the circulating mixed liquor flowing upwardly is fully mixed with the waste water and the return sludge from the supply pipe 127. Since the fins 137 are formed to extend so that the tip ends thereof may be close to the upward flow tube 101 in the above described case, the fins 137 also prevent the downward flow tube 103 from swinging.

Figure 13:
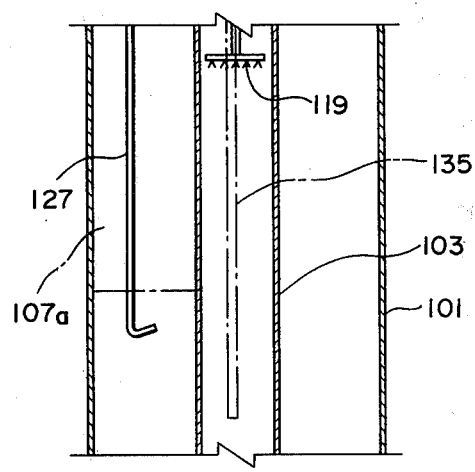
FIG. 13 is a longitudinal sectional view showing a major portion of another example of the mixing means.

The embodiment of FIG. 13 is constructed so that the tip end of the supply pipe 127 is directed obliquely to the circumferential direction of the downward flow tube 103 and a nozzle portion is provided at the tip end thereof, so that a jet flow of the waste water in the oblique direction may improve the mixing.

The mixing means for the waste water and the circulating mixed liquor may be implemented in other various manners such as a propeller, apart from the above described examples.

The treated mixed liquor or treated water flows out of the present circulation system and then it is subjected to a conventional well-known treating step for example in a floatation tank, a precipitation tank, or the like; however, a conventional denitrification process may be further employed at the preceeding stage in practicing the present invention.

Figure 14:
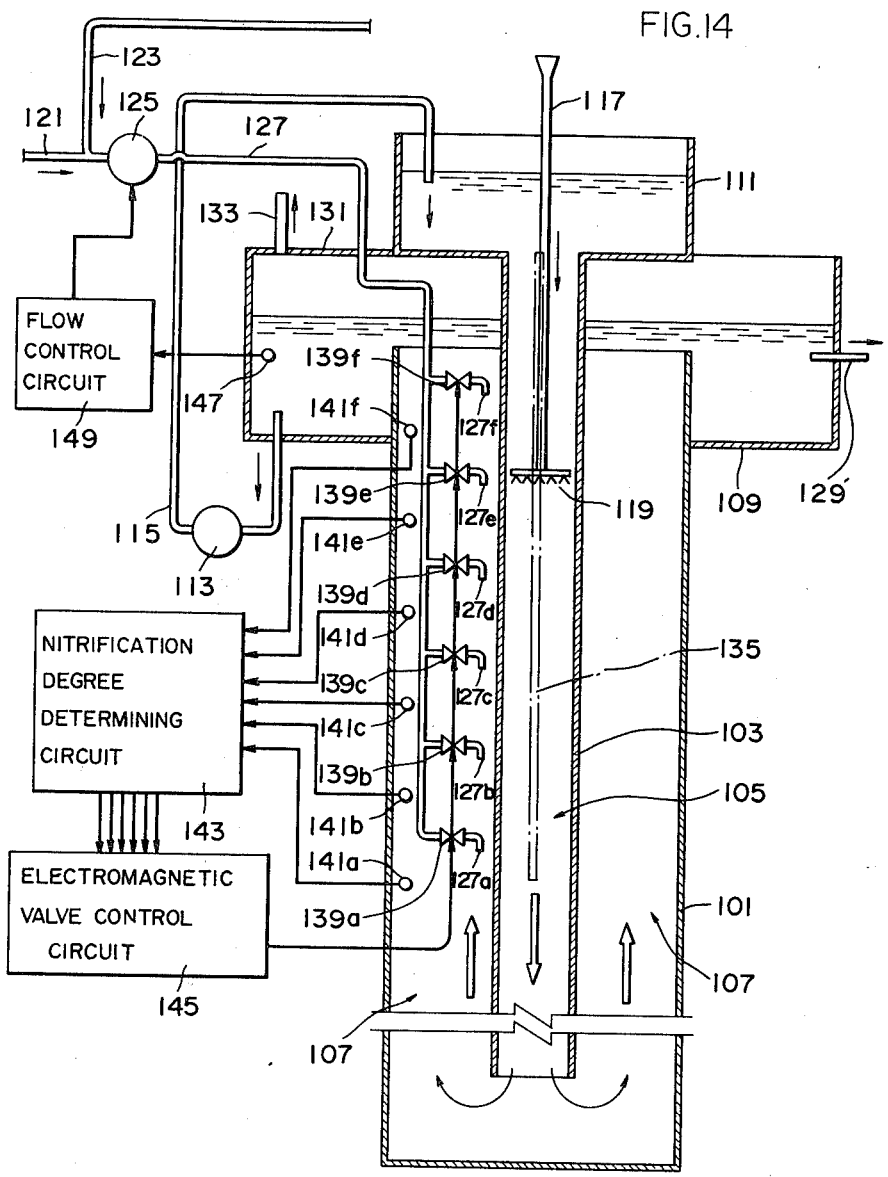
FIG. 14 is a longitudinal sectional view showing the structure of a further embodiment of the present invention.

FIG. 14 is a longitudinal sectional view showing a further embodiment of the present invention comprising a modification of the embodiments described above in conjunction with FIGS. 7 and 9. The embodiment shown is characterized in that the position or level in the depth direction of the upward flow chamber 107 where the waste water and the return sludge is supplied may be properly changed. To that end, the supply pipe 127 is provided with a plurality of supply ports 127a, 127b, ... 127f. Electromagnetic valves 139a to 139f are operatively inserted in the respective supply ports 127a to 127f. In the case where the supply port 127a is to be rendered effective, for example, only the electromagnetic valve 139a is opened, while the remaining electromagnetic valves 139b to 139f are all closed. Concentration sensors 141a to 141f are provided in association with the supply ports 127a to 127f, respectively, in the upward flow chamber 107. The concentration sensors 141a to 141f measure the degree of nitrification at the respective positions or levels and each comprises an electrode for measuring the concentration of nitrite nitrogen ($NO_2$-N) and nitrate nitrogen ($NO_3$-N) in the mixed liquor. The respective outputs of these sensors 141a to 141f are applied to a nitrification degree determining circuit 143. The nitrification degree determining circuit 143 is responsive to the concentration of ammonium nitrogen contained in the waste water and to the concentration output from these sensors 141a to 141f to determine the degree of nitrification at the positions or levels of the respective sensors 141a to 141f. For example, ammonium if the nitrogen content in the waste water is 20 ppm and the concentration detected by the sensor 141a is 1 ppm, the degree of nitrification is determined as 95%. An output is obtained from the nitrification degree determining circuit 143 and is applied to an electromagnetic valve control circuit 145 for opening only an electromagnetic valve corresponding to the position or level where the degree of nitrification has progressed more than say 90 to 95% among the above described sensors 141a to 141f. For example, assuming that the degree of nitrification is determined as 95% at the position of the sensor 141d by means of the circuit 143, then the circuit 145 provides a control signal for opening only the electromagnetic valve 139d and for closing all the remaining electromagnetic valves.

On the other hand, a concentration sensor 147 is provided in the reserve tank 109 for measuring the concentration of the dissolved oxygen in the mixed liquor in the reserving tank 109 and the output therefrom is applied to a flow control circuit 149. The flow control circuit 149 controls a variable capacity pump 125, if and when the dissolved oxygen concentration as measured by the concentration sensor 147 is larger than say 1 ppm, preferably larger than 0.5 ppm, for increasing the amount of the waste water and/or the return sludge flowing into the supply pipe 127.

According to the embodiment of FIG. 14, it is possible to supply the waste water and the return sludge at the position or level where the degree of nitrification has progressed more than a desired value, say more than 90 to 95%. Accordingly, it is avoided to supply waste water and return sludge to a level where the degree of nitrification is insufficient. On the other hand, since it is possible to supply waste water and return sludge to the optimum position or level upon detection of the degree of nitrification, both the nitrification step and the denitrification step can be carried out with high efficiency. In addition, since the quantity of waste water being supplied and of return sludge is controllably changed upon measurement of the dissolved oxygen concentration in the reserving tank 109, the treatment efficiency is further enhanced because, if the dissolved oxygen concentration is measured to be a predetermined value, say 1 ppm by means of the sensor 147, for example, this means that much more waste water can be treated in the aeration tank 100 in such a case and the amount of waste water being supplied and of return sludge may be increased in an advantageous manner.

In the above described embodiment, the sensors 141a to 141f were directly disposed in the upward flow chamber 107. However, these sensors 141a to 141f may be provided outside the upward flow chamber 107. For example, the apparatus may be constructed so that the mixed liquor is withdrawn outside the tank in a sampling manner at appropriate positions levels distributed in the depth direction of the upward flow chamber 107 so that the concentration of the mixed liquor may be checked by testing the sampled mixed liquor. By thus measuring the concentration of the sampled mixed liquor, the maintenance of the sensors 141a to 141f is much more simplified.

Figure 15:
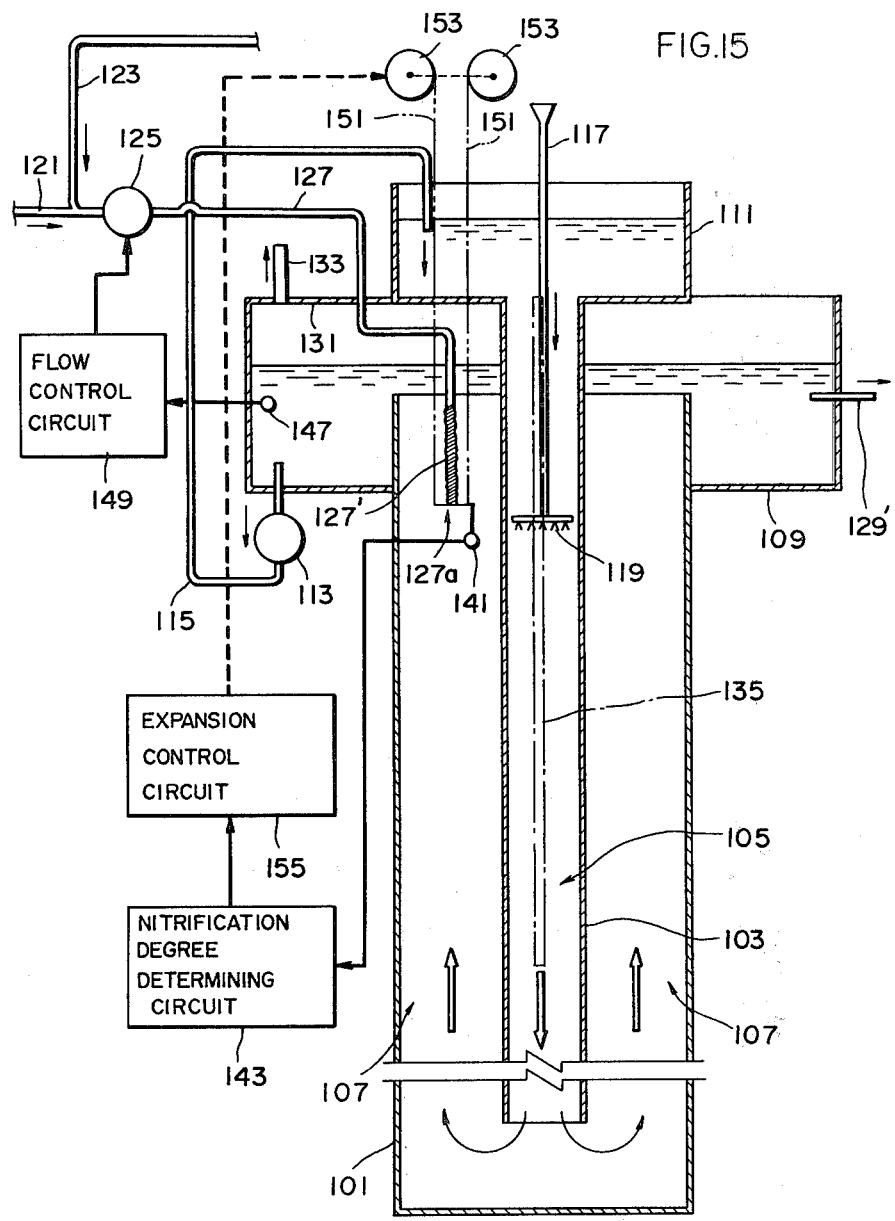
FIG. 15 is a longitudinal sectional view showing the structure of still a further embodiment of the present invention.

FIG. 15 is a longitudinal sectional view showing a further embodiment of the present invention comprising a modification of FIG. 14. More specifically, in FIG. 15 the supply pipe 127 has an expansion portion 127', so that the supply pipe 127 as a whole may be extended. The tip end of the expansion portion 127' is opened as a supply port for the waste water and the return sludge. The position or elevation of the supply port 127a is changed in the depth direction of the upward flow chamber 107 by means of the expansion control circuit 155. More specifically, a concentration sensor 141 is provided in the vicinity of the supply port 127a and the output of the concentration sensor 141 is applied to the nitrification degree determining circuit 143. The concentration of nitrite nitrogen and nitrate nitrogen in the mixed liquor at the position of the sensor 141 at that time is measured by means of the sensor 141. If it is determined by the nitrification degree determining circuit 143 that the degree of nitrification is smaller than a predetermined value, say 90 to 95%, a signal for changing the position of the sensor 141 and thus the position of the supply port 127a upwardly is applied to the expansion or extension control circuit 155. Conversely, if it is determined by the nitrification degree determining circuit 143 that the degree of nitrification at a given position of the sensor 141 is larger than a predetermined value, a control signal is applied to the expansion control circuit 155 for changing the position of the sensor 141 and thus the position of the supply port 127a downwardly. The expansion control circuit 155 comprises, for example, a motor, not shown, which is is responsive to the control signal obtained from the nitrification degree determining circuit 143 to rotate a pulley 153 in a clockwise or counterclockwise direction to wind or unwind a wire 151, so that the position or elevation of the supply port 127a is changed in the depth direction of the upward flow chamber 107. Otherwise the embodiment of FIG. 15 operates in the same manner as that of FIG. 14.

Rather than measuring or sensing the concentration of nitrite nitrogen and nitrate nitrogen in the mixed liquor, the sensors 141a to 141f or 141 may be adapted for measuring concentration of ammonium nitrogen ($NH_4$-N) in the mixed liqour. The nitrification degree determining circuit 143 is then also adapted so that the degree of nitrification is determined based on the concentration of the ammonium nitrogen contained in the waste water and measured by the sensors 141a to 141f or 141. For example, if and when an ammonium nitrogen content of 20 ppm is present in the waste water and the concentration of ammonium nitrogen measured by any of the sensors is 1 ppm, the degree of nitrification is determined as 95%.

The above described embodiment employed the sensor 147 for measuring the dissolved oxygen concentration in the mixed liquor in the reserve tank 109. However, the sensor 147 may be replaced by a sensor for measuring an oxidization-reduction potential. If and when an oxidization-reduction potential is larger than a predetermined value, say 0 mV preferably 150 mV, the amount of the waste water (and/or the return sludge) being supplied to the upward flow chamber 107, is increased. As a result, waste water can be treated with a good efficiency.

Figure 15A:
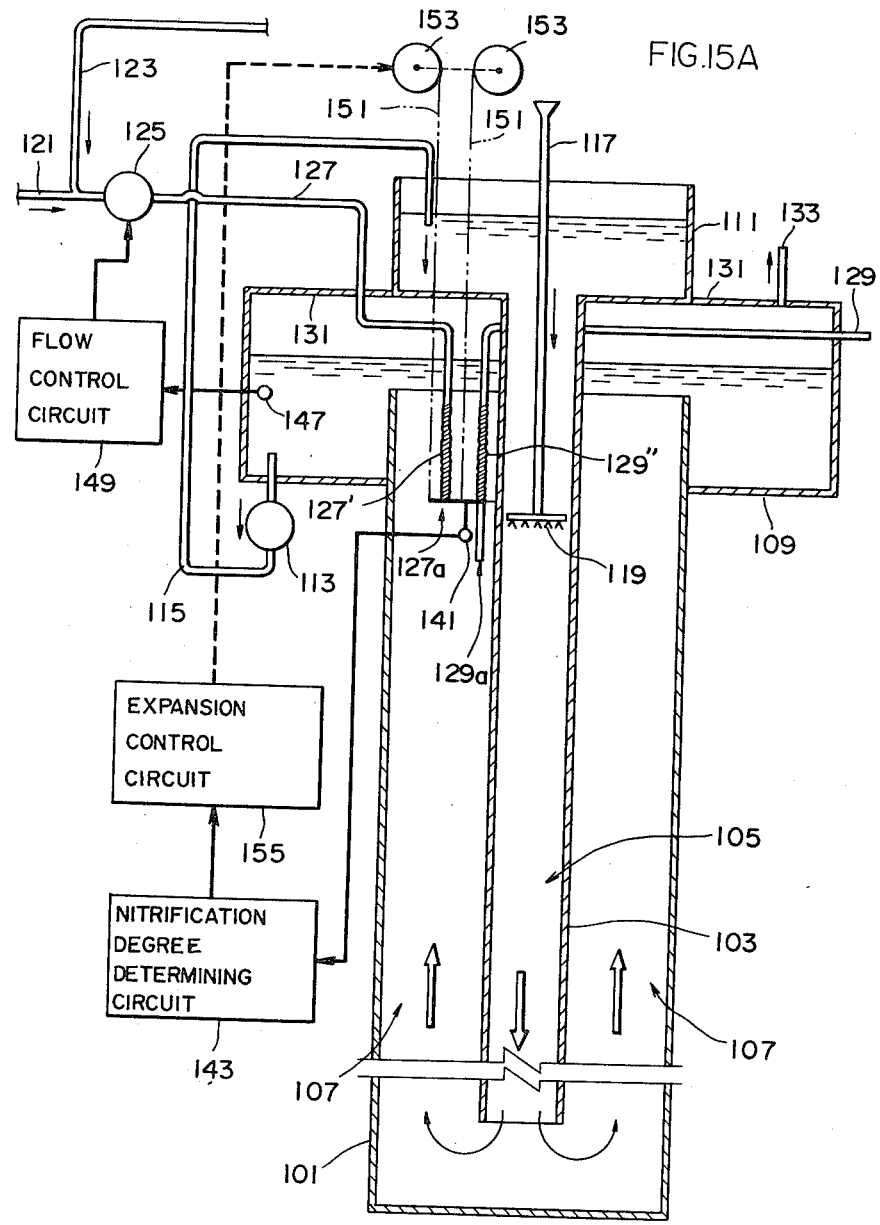
FIG. 15A is a longitudinal sectional view showing the structure of still another embodiment of the present invention.

FIG. 15A is a longitudinal sectional view showing a still further embodiment of the present invention comprising a modification of the embodiment of FIG. 7. 15A the partition 135 has been dispensed with and the position or elevation of the waste water supply inlet and of a return sludge inlet is adapted to be changeable. More specifically, as in FIG. 15, a portion of the supply pipe 127 is formed as an expansion portion 127', whereby the position or elevation of the supply port 127a is changeable in the depth direction. Similarly, the flow out pipe 129 is also structured partially as an expansion portion 129", so that the position or elevation of the outlet 129a is also changeable in the depth direction. The position of the outlet 129a need be always spaced apart from and below the supply port 127a by a predetermined length, say 50 cm, in spite of expansion or contraction of the expansion portions 127' and 129". The embodiment shown has adopted a unitary expansion structure of the flow out pipe 129 and the supply pipe 127 for simplicity of a structure associated with the expansion control. Such expansion structure may be provided for each of the pipes as a matter of course.

FIG. 16 is a longitudinal sectional view showing a further embodiment of an aeration tank for use in the present invention. The aeration tank 200 shown in FIG. 16 is characterized by an upward flow chamber 207 which is in common to a plurality of downward flow chambers 205A, 205B. More specifically, an outer tube or an upward flow tube 201 is buried to extend underground substantially in the vertical direction. Two inner tubes or downward flow tubes 203A and 203B are inserted into the upward flow tube 201. The downward flow tubes 203A and 203B constitute the downward flow chambers 205A and 205B. The downward flow tubes 203A and 203B and the upward flow tube 201 all together define an upward flow chamber 207. A reserve tank 209 is located at the upper end of the upward flow chamber 207. Reserve tanks 111A and 111B are located at the upper ends of the downward flow tubes 205A and 205B, respectively. Circulation pipes 215A and 215B are provided from the reserve tank 209 to the reserve tanks 111A and 111B, respectively. Each circulation pipe 215A and 215B comprises a respective circulation pump 213A and 213B. Gas supply pipes 217A and 217B for supplying an oxygen containing gas are inserted into the downward flow chambers 205A and 205B, respectively, and gas dispersing members 219A and 219B are provided at the lower ends of these gas supply pipes 217A and 217B, respectively. The gas supply pipes 217A and 217B are connected to receive air or oxygen from blowers 257A and 257B, respectively. However, these blowers 257A and 257B may be omitted, if desired.

A separation tank 259 communicates with the reserving tank 209. A portion of activated sludge separated in the separation tank 259 is returned by means of the sludge returning pipe 223. A supply pipe 227 is connected to supply waste water and the activated sludge to the tank 200.

By utilizing circulation type aeration tank 200 of FIG. 16, proper selection can be made to use either the downward flow tube 203A and 203B or to use the two downward flow tubes 203A and 203B depending on a change of the amount of the waste water and the load of organic matter and nitrogen. Accordingly, as a whole, an economical running opeation can be performed with respect to a change in the load such as the amount of waste water, and the amount of organic matter and nitrogen. In addition, since the outer tube is provided in common for a plurality of downward flow chambers, the installation cost has been drastically reduced as compared with a case where a plurality of aeration tanks each having an outer tube and an inner tube are provided. The present invention can be advantageously employed even in such a circulation type aeration tank 200.

FIG. 18 is similar to FIG. 17 and is a transversal sectional view showing a different example of the arrangement of the upward flow tube 201 and the downward flow tubes 203A and 203B. The embodiment of FIG. 18 also comprises the two downward flow chambers 205A and 205B for one upward flow chamber 207.

Figure 19:
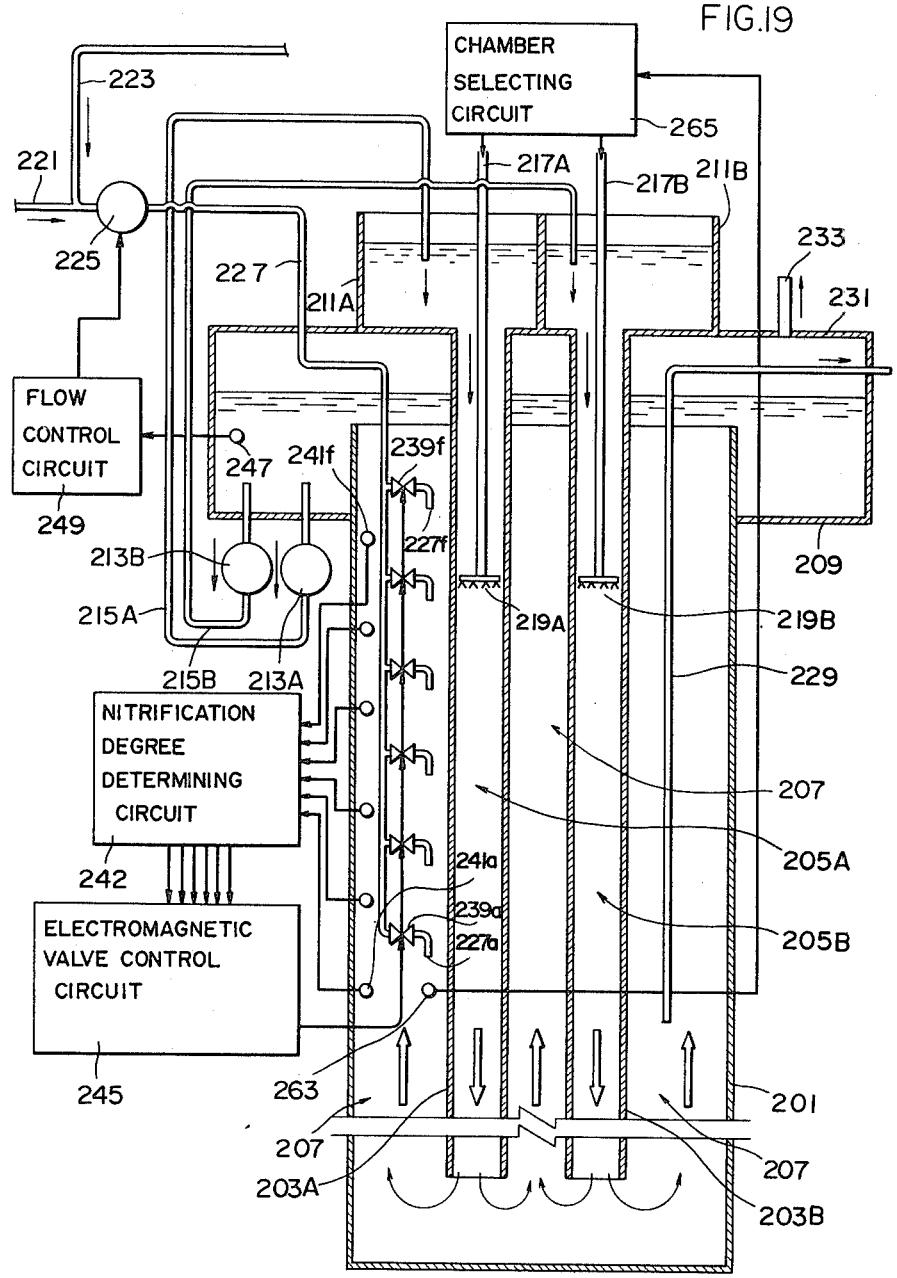
FIG. 19 is a longitudinal sectional view showing a structure of a still further embodiment of the present invention.

FIG. 19 is a longitudinal sectional view showing a further embodiment of the present invention comprising an application of the embodiment of FIG. 14 to the circulation type aeration tank 200 of FIG. 16. More specifically, two downward flow tubes 203A and 203B are inserted in the upward flow tube 201. A supply pipe 227 is inserted into the upward flow chamber 207. The supply pipe 227 has supply ports 227a to 227f opened at different positions or levels distributed in the depth direction of the upward flow chamber 207. Electromagnetic valves 239a to 239f are provided at the supply ports 227a to 227f, respectively. These electromagnetic valves 239a to 239f are controlled so that any one of them is selectively opened by an electromagnetic valve control circuit 245, while the remaining valves are closed. Sensors 241a to 241f are provided to measure the concentration of ammonium nitrogen and nitrite nitrogen or nitrate nitrogen at the respective positions of the upward flow chamber 207. The nitrification degree determining circuit 243 and the electromagnetic valve control circuit 245 are responsive to the outputs from these sensors 241a to 241f to open any proper one of the electromagnetic valves and to close the remaining electromagnetic valves. A flow control 249 is responsive to the output of a sensor 247 in the reserve tank 209 to variably control the amount of waste water and/or of the return sludge fed by variable capacity pump 225 to the supply pipe 227.

The embodiment of FIG. 19 further comprises a sensor 263 in the upward flow chamber 207. The output of the sensor 263 is applied to the chamber selecting circuit 265. The sensor 263 measures the dissolved oxidation concentration or the oxidation-reduction potential. The chamber selecting circuit 265 renders effective a larger number of downward flow chambers when the dissolved oxygen concentration as measured by the sensors 263 is smaller than say 1.5 ppm, preferably smaller than 2 ppm. For example, in the case where only one downward flow chamber 205A has been presently rendered effective, the other downward flow chamber 205B is also further rendered effective, when the dissolved oxygen concentration at the position of the sensor 263 is smaller than a predetermined value. The chamber selecting circuit 265 enables a supply of an oxygen containing gas through an oxygen containing gas supply pipe 217A and/or 217B in response to the dowward flow chamber being rendered effective.

FIG. 20 is a longitudinal sectional view showing a yet another embodiment of the present invention comprising two aeration tanks 100A and 100B using one reserve tank 109 and one reserve tank 111 in common. A circulation pipe 113 operatively connects the reserve tank 109 to the reserve tank 111 and includes a circulation pump 115. Pipes 127A and 127B for supplying waste water and return sludge are inserted into the upward flow chambers 107A and 107B of the aeration tanks 100A and 100B, respectively. The upward flow chambers 107A and 107B are further provided with mixed liquor discharge pipes 129A and 129B, respectively.

Since the embodiment of FIG. 20 is adapted so that the reserve tanks and the circulation pump are commonly utilized for a plurality of aeration tanks, the facilities of a large treating capacity can be achieved at relatively low costs. Only one circulation pump is sufficient and accordingly the power consumption can also be reduced. A result, an economical apparatus is provided as a whole.

The embodiment of FIG. 20 also allows for a change of the position or elevation of the supply inlet for waste water and for return sludge in the depth direction of the upward flow chamber 107 depending on the degree of nitrification, as is done in the embodiments shown in FIGS. 14 and 15. The amount of waste water and of return sludge may also be changed depending on the dissolved oxygen concentration.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An apparatus for processing waste water containing an organic matter and nitrogen, comprising: a first long vertical downward chamber (105) open at the top buried under the ground for allowing for a flow of a mixed liquor to be processed in a circulation manner, downwardly through said long vertical downward chamber, a second long vertical upward chamber buried under the ground and arranged in association with said first long vertical downward chamber for allowing said mixed liquor fed through said first long vertical downward chamber to flow upwardly through said second long vertical upward chamber, forced circulating means operatively connected to said first and second chambers for positively circulating said mixed liquor from said second long vertical upward chamber to said first long vertical downward chamber, said forced circulating means including a lower communicating portion for communication between the lower portion of said first long vertical downward chamber and the lower portion of said second long vertical upward chamber and power driven pump means inserted between the upper portion of said second long vertical upward chamber and the upper portion of said first long vertical downward chamber, gas supplying means (117, 119) operatively connected only to said first open downward chamber (105) for supplying an oxygen containing gas into said first long vertical downward chamber, said gas supplying means (117, 119) forming an aerobic zone in said first open downward chamber (105) for nitrifying said mixed liquor being circulated by said forced circulating means mainly in said aerobic zone of said first long vertical downward chamber, whereby the supplied oxygen is dissolved into said mixed liquor with high efficiency as a function of a static water pressure in said first long vertical downward chamber, means (131 or 131, 135) closing at least a portion of said second upward chamber for forming an anaerobic zone in said closed portion of said second upward chamber, waste water supplying means (127) operatively connected to said closed portion of said second upward chamber for supplying a waste water into said closed portion of said long vertical upward chamber, said supplying means (127) having an open end (127a) reaching down to a given elevation in the vertical direction of said closed portion of said second long vertical upward chamber for denitrifying said nitrified mixed liquor in said anaerobic zone above said given elevation, withdrawing means operatively connected to said upward flow chamber means for withdrawing processed water, and gas discharging means (133) operatively connected to said closed portion of said second upward flow chamber for discharging externally a nitrogen gas produced by said denitrifying, whereby the mixed liquor, as viewed in the flow direction down in said first chamber and up in said second chamber, is first nitrified and then denitrified.

2. The apparatus of claim 1, wherein said withdrawing means comprises means coupled to said power driven circulation means for discharging treated water therefrom.

3. The apparatus of claim 1, which further comprises activated sludge returning means operatively connected to said upward flow chamber means for returning at least a portion of an activated sludge in the processed water withdrawn by said withdrawing means, to a given elevation in the depth direction of said upward flow chamber means.

4. The apparatus of claim 3, wherein the elevation where the activated sludge is to be returned into said upward flow chamber means by means of said activated sludge returning means, is selected in association with the position where the waste water is supplied by means of said waste water supply means.

5. The apparatus of claim 4, wherein said activated sludge returning means is coupled to said waste water supply means, whereby the return activated sludge is supplied to said upward flow chamber means together with said waste water.

6. The apparatus of claim 1, wherein said processed water withdrawing means comprises pipe means (129) having an inlet (129a) at a given elevation in the depth direction of said upward flow chamber, which elevation is selected to be located lower than said denitrification zone (107a) and upstream of the elevation (127a) where said waste water is to be supplied by said waste water supply means.

7. The apparatus of claim 1, which further comprises partition means located in said upward flow chamber means for partitioning said upward flow chamber means into two compartments at a location above said elevation where said waste water is to be supplied by said waste water supply means, wherein said waste water supply means is adapted to supply said waste water into one of said two compartments of said upward flow chamber means, and wherein said processed water withdrawing means is adapted to withdraw the processed water from the other of said two compartments of said upward flow chamber means.

8. The apparatus of claim 1, which further comprises first reserve tank means located at the upper end of said downward flow chamber means.

9. The apparatus of claim 8, wherein said processed water withdrawing means comprises pipe means communicated with said first reserve tank means.

10. The apparatus of claim 1 or 8, which further comprises second reserve tank means located at the upper end of said upward flow chamber means for cooperation therewith.

11. The apparatus of claim 10, wherein said processed water withdrawing means comprises pipe means communicated with said second reserve tank means.

12. The apparatus of claim 1, which further comprises first reserve tank means located at the upper end of the downward flow chamber means, and second reserve tank means located at the upper end of said upward flow chamber means, and wherein said power driven circulation means is arranged to operatively connect said second reserve tank means to said first reserve tank means.

13. The apparatus of claim 1, wherein said downward flow chamber means comprises a plurality of downward flow chambers each including said oxygen containing gas supplying means, and wherein said upward flow chamber means is provided in common with said plurality of downward flow chambers.

14. The apparatus of claim 13, further comprising measuring means including concentration measuring means for measuring the dissolved oxygen concentration in the vicinity of the elevation where waste water is to be supplied into said upward flow chamber means, and activating means including means responsive to said concentration measuring means for activating an increased number of downward flow chambers when said dissolved oxygen concentration is smaller than a predetermined concentration.

15. The apparatus of claim 13, further comprising measuring means including potential measuring means for measuring an oxidation-reduction potential in the vicinity of said elevation where waste water is to be supplied into the upward flow chamber means, and activating means including means responsive to said potential measuring means for activating an increased number of downward flow chambers when said oxidation-reduction potential is smaller than a predetermined value.

16. The apparatus of claim 13, further comprising measuring means including amount measuring means for measuring any one of the amount of an organic matter, an amount of nitrogen in said waste water being supplied by said waste water supplying means, and activating means including means responsive to said amount measuring means for activating an increased number of downward flow chambers when any one of said measured amounts is larger than a predetermined value.

17. The apparatus of claim 13, wherein said waste water supplying means comprises means for changing the elevation where waste water is to be supplied into said upward flow chamber means, and which further comprises measuring means for measuring a chemical property of mixed liquor at a given position of said circulating means, and position changing means responsive to a measurement made by said measuring means for changing the position where waste water is to be supplied into the upward flow chamber means.

18. The apparatus of claim 1, which further comprises activated sludge returning means operatively connected to said upward flow chamber means for returning at least a portion of an activated sludge being mixed with processed water and withdrawn from said processed water withdrawing means, to a given elevation in the depth direction of said upward flow chamber means.

19. The apparatus of claim 18, wherein the elevation to which said activated sludge is returned by said activated sludge returning means is selected in response to the position where waste water is to be supplied by said waste water supplying means.

20. The apparatus of claim 19, wherein said activated sludge returning means is coupled to said waste water supplying means, whereby said activated sludge is supplied into said upward flow chamber means together with waste water.

21. The apparatus of claim 1, which further comprises mixing means operatively arranged for cooperation with said waste water supplying means for mixing waste water being supplied with mixed liquor being treated in said circulating means.

22. An apparatus for processing waste water containing an organic matter and nitrogen, comprising: long vertical downward chamber means buried under the ground for allowing for a flow of a mixed liquor to be processed in a circulation manner, downwardly through said long vertical downward chamber, long vertical upward chamber means buried under the ground and arranged in association with said long vertical downward chamber means for allowing said mixed liquor fed through said long vertical downward chamber means, to flow upwardly through said long vertical upward chamber means, power driven circulating means operatively connected to said chamber means for positively circulating said mixed liquor from said long vertical upward chamber means to said long vertical downward chamber means, said power driven circulating means including a lower communicating portion for communication between the lower portion of said long vertical downward chamber means and the lower portion of said long vertical upward chamber means, and pump means inserted between the upper portion of said long vertical upward chamber means and the upper portion of said long vertical downward chamber means, gas supplying means operatively connected to said downward chamber means for supplying an oxygen containing gas into said long vertical downward chamber means for nitrifying said mixed liquor being circulated by said circulating means mainly in said long vertical downward chamber means, whereby the supplied oxygen is dissolved into said mixed liquor with high efficiency as a function of a static water pressure of said long vertical downward chamber means, waste water supplying means operatively connected to said upward chamber means for supplying a waste water into said long vertical upward chamber means at a given elevation in the vertical direction of said long vertical upward chamber means for forming a denitrifying region having anaerobic state above said given elevation, whereby said nitrified mixed liquor is denitrified in said denitrifying region, withdrawing means operatively connected to said upward flow chamber means for withdrawing processed water, and gas discharging means operatively connected to said upward flow chamber means for discharging externally a nitrogen gas produced from said denitrifying region due to said denitrification, and wherein said waste water supplying means comprise elevation changing means for changing the elevation where waste water is to be supplied into the upward flow chamber means, and which further comprises measuring means for measuring a chemical property of a mixed liquor at a given elevation of said circulating means, and position changing means responsive to a measurement by said measuring means and operatively connected to said waste water supplying means for changing the position where waste water is to be supplied by said waste water supplying means.

23. The apparatus of claim 22, wherein said measuring means comprises nitrification measuring means for measuring the degree of nitrification at a given elevation of said upward flow chamber means, and wherein said position changing means comprises means responsive to said nitrification measuring means for changing upwardly said elevation where waste water is to be supplied when said degree of nitrification is smaller than a predetermined degree.

24. The apparatus of claim 23, wherein said nitrification measuring means comprises concentration measuring means for measuring the concentration of ammonium nitrogen ($NH_4$—N) contained in said mixed liquor, and wherein said position changing means comprises means responsive to said concentration measuring means for changing upwardly said elevation where waste water is to be supplied when the concentration of ammonium nitrogen is larger than a predetermined concentration.

25. The apparatus of claim 23, wherein said nitrification measuring means comprises concentration measuring means for measuring the concentration of one of nitrite nitrogen ($NO_2$—N) and nitrate nitrogen ($NO_3$—N) contained in said mixed liquor, and wherein said position changing means comprises means responsive to said concentration measuring means for changing upwardly the elevation where waste water is to be supplied when the concentration of one of nitrite nitrogen and nitrate nitrogen is smaller than a predetermined concentration.

26. The apparatus of claim 22, or 23, or 24 or 25, wherein said waste water supplying means comprises a plurality of supply ports located at different elevations in the depth direction of said upward flow chamber means, and wherein said position changing means comprises means responsive to a measurement made by said measuring means for selectively opening one of said plurality of supply ports.

27. The apparatus of claim 22, or 23, or 24 or 25, wherein said waste water supply means comprises extendable pipe means for allowing for a continual or stepwise change of the position or elevation of a supply port in the depth direction of said upward flow chamber means, and wherein said position changing means comprises means responsive to a measurement made by said measuring means for contracting or expanding said extendable pipe means.

28. The apparatus of claim 1 or 22, wherein said waste water supplying means comprises supply amount changing means for changing the amount of waste water being supplied, and which further comprises measuring means for measuring a chemical property of said mixed liquor at a given position of said circulating means, and supply amount changing means responsive to a measurement made by said measuring means for changing the supply amount of waste water by acting upon said supply amount changing means.

29. The apparatus of claim 28, wherein said measuring means comprises concentration measuring means for measuring a dissolved oxygen concentration, and wherein said supply amount changing means comprises means responsive to said concentration measuring means for increasing the amount of waste water being supplied when said dissolved oxygen concentration is larger than a predetermined concentration.

30. The apparatus of claim 28, wherein said measuring means comprises potential measuring means for measuring an oxidation-reduction potential, and wherein said supply amount changing means comprises means responsive to said potential measuring means for increasing the amount of said waste water being supplied when said oxidation-reduction potential is larger than a predetermined value.

31. An apparatus for processing waste water containing an organic matter and nitrogen, comprising: long vertical downward chamber means buried under the ground for allowing for a flow of a mixed liquor to be processed in a circulation manner, downwardly through said long vertical downward chamber, long vertical upward chamber means buried under the ground and arranged in association with said long vertical downward chamber means for allowing said mixed liquor fed through said long vertical downward chamber means, to flow upwardly through said long vertical upward chamber means, power driven circulating means operatively connected to said chamber means for positively circulating said mixed liquor from said long vertical upward chamber means to said long vertical downward chamber means, said power driven circulating means including a lower communicating portion for communication between the lower portion of said long vertical downward chamber means and the lower portion of said long vertical upward chamber means, and pump means inserted between the upper portion of said long vertical upward chamber means and the upper portion of said long vertical downward chamber means, gas supplying means operatively connected to said downward chamber means for supplying an oxygen containing gas into said long vertical downward chamber means for nitrifying said mixed liquor being circulated by said circulating means mainly in said long vertical downward chamber means, whereby the supplied oxygen is dissolved into said mixed liquor with high efficiency as a function of a static water pressure of said long vertical downward chamber means, waste water supplying means operatively connected to said upward chamber means for supplying a waste water into said long vertical upward chamber means at a given elevation in the vertical direction of said long vertical upward chamber means for forming a denitrifying region having anaerobic state above said given elevation, whereby said nitrified mixed liquor is denitrified in said denitrifying region, withdrawing means operatively connected to said upward flow chamber means for withdrawing processed water, and gas discharging means operatively connected to said upward flow chamber means for discharging externally a nitrogen gas produced from said denitrifying region due to said denitrification, wherein said downward flow chamber means comprise a plurality of downward flow chambers, said apparatus further comprising measuring means for measuring a chemical property of mixed liquor at a given position or elevation of said circulating means, and activating means responsive to a measurement made by said measuring means for selectively activating at least one of said plurality of downward flow chambers.

32. The apparatus of claim 31, wherein said measuring means comprises nitrification measuring means for measuring the degree of nitrification at a given position or elevation of said upward flow chamber means, and wherein said activating means comprises means responsive to said nitrification measuring means for activating an increased number of downward flow chambers when the degree of nitrification is smaller than a predetermined value.

33. The apparatus of claim 32, wherein said nitrification measuring means comprises concentration measuring means for measuring the concentration of ammonium nitrogen ($NH_4-N$) contained in mixed liquor, and wherein said activating means comprises means responsive to said concentration measuring means for activating an increased number of downward flow chambers when the concentration of ammonium nitrogen is larger than a predetermined concentration.

34. The apparatus of claim 32, wherein said nitrification measuring means comprises concentration measuring means for measuring the concentration of nitrite nitrogen ($NO_2-N$) and nitrate nitrogen ($NO_3-N$) contained in mixed liquor, and wherein said activating means comprises means responsive to said concentration measuring means for activating an increased number of downward flow chambers when the concentration of said nitrite nitrogen and nitrate nitrogen is smaller than a predetermined concentration.

* * * * *